Sept. 13, 1938.                 C. L. RILEY                    2,130,154
                         HEAT TREATING POWERED MATERIAL
                            Filed Jan. 19, 1937
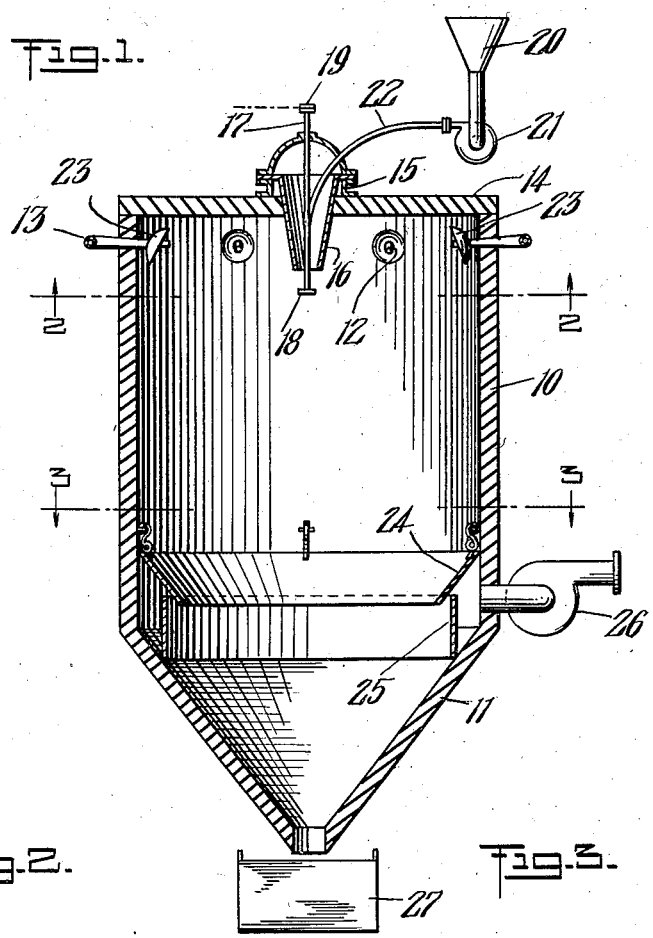
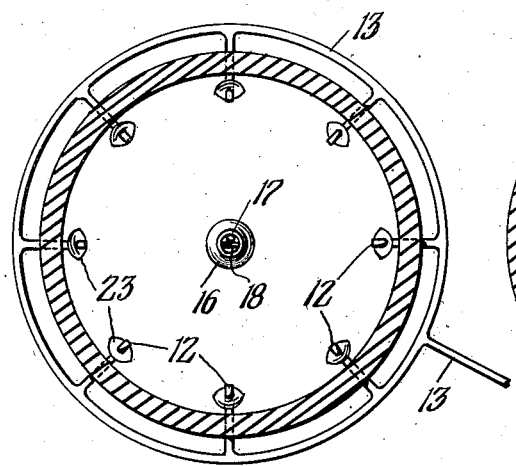
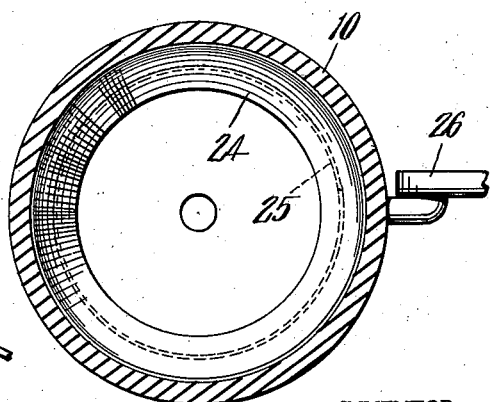
INVENTOR.
Champlain L. Riley
BY Kenyon & Kenyon
ATTORNEYS.

Patented Sept. 13, 1938

2,130,154

UNITED STATES PATENT OFFICE 2,130,154

HEAT TREATING POWDERED MATERIAL

Champlain L. Riley, Watchung, N. J., assignor to Industrial Associates, Inc., New York, N. Y., a corporation of New York Application January 19, 1937, Serial No. 121,279

3 Claims. (Cl. 34—34)

This invention relates to heat treatment of powdered material and more especially to a method of drying and roasting green coffee beans or other organic material.

In roasting coffee as the art is practiced today, it is necessary to roast the outside of the coffee bean too much in order to heat the inner part of the bean sufficiently. The coffee is, therefore, not uniformly roasted.

An object of this invention is a method of roasting coffee in which green coffee in powdered form is subjected to accurately controlled temperature, whereby all the coffee is subjected to the same temperature and uniform roasting thereof is effected.

The apparatus for treating coffee according to the present invention comprises a cylindrical chamber having insulated walls, top and bottom, with a centrifugal atomizer inserted through the ceiling of the chamber. A series of gas jets with reflectors focused at or near the atomizer is provided near the ceiling of the roasting chamber. The powdered green coffee is subjected to an atomizer which discharges the powdered coffee in a horizontal plane from which the coffee falls to the bottom of the chamber. The quantity of coffee sprayed by the atomizer is properly proportional to the heat emitted by the gas jets so that in falling through the heated atmosphere, it is roasted to the desired exent. Near the bottom of the chamber is arranged an annular duct having suitable openings communicating with the chamber. To this duct is connected an exhauster of a size suitable to remove the moisture which may be evaporated from the powdered material, the products of combustion and also the fumes, if any, from the roasted material.

Other objects, novel features and advantages of this invention will become apparent from the following specification and accompanying drawing, wherein:

Fig. 1 is a vertical section through an apparatus for practicing the invention;

Fig. 2 is a section on the line 2—2 of Fig. 1, and

Fig. 3 is a section on the line 3—3 of Fig. 1.

A cylindrical tower 10 terminates at its bottom in a hopper 11. Near the top of the tower is arranged a series of nozzles 12 which are connected to a pipe 13 through which properly carbureted gas is supplied at uniform pressure. These nozzles 12 are arranged radially of the tower and are uniformly spaced. In the ceiling 14 of the tower is provided a centrifugal sprayer 15 which consists essentially of a conical housing 16 through which extends a spindle 17 having a disk 18 at its lower end. At the upper end of the spindle 17 is provided a pulley 19 to which power is transmitted by any suitable means for effecting rotation of the spindle.

A hopper 20 has its outlet communicating with a blower 21, the outlet of which leads to the interior of the housing 16 through a pipe 22. Reflectors 23 are provided on the nozzles 12 and are focused on or near the disk 18 for reflecting to the sprayer heat generated by the combustion of gas supplied through the nozzles.

Near the bottom of the tower is provided a conical shield 24, the upper end of which is in contact with the inner periphery of the tower and the lower end of which extends a short distance into the top of a cylinder 25 supported by the hopper 11, there being slight clearance between the cone 24 and cylinder 25. These two members form an annular duct with the bottom portion of the tower 10 and the upper portion of the hopper 11 and an exhaust fan 26 has its inlet connected with such duct. The clearance between the cone 24 and cylinder 25 provides a passageway for the ingress of gas and vapor into the duct.

In the practice of the invention, powdered green coffee or other similar material to be heat treated is charged into the hopper 20 from a suitable supply source. The blower 21 supplies a stream of the powdered material to the disk 18 which is rotated at a high speed. The disk discharges the powdered material in a horizontal plane from which it falls to the bottom of the tower. The powdered material is subjected to the temperature produced by the heat developed by combustion of gas supplied through the nozzles 12 and the quantity of the powdered material sprayed by the disk 18 is so proportioned to the heat supplied that it is roasted to the desired extent.

The roasting temperature is accurately controlled by regulation of the supply of gas and the powdered material is heated particle by particle under uniform conditions so that uniform roasting of the material is effected. Moisture evaporated from the powdered material, products of combustion and also the fumes, if any, from the roasted material, are removed by the exhauster 26 through the duct previously described. The roasted material passes through the cone 24 and cylinder 25 into the hopper 11 from which it is discharged into a suitable receptacle 27.

Although the method has been specifically disclosed in connection with roasting coffee, it is to be understood that it is equally applicable to the drying or roasting or other similar organic materials. Furthermore, the method may be used also for drying to remove water from solutions or suspensions of solid material.

In such event, the solution or suspension of solid material in liquid would be supplied to the hopper 20 and fed through the pipe 22 to the sprayer 18. As previously described, the sprayer 18 projects the liquid into a horizontal plane where it is subjected to the heat from the gas jets thereby evaporating and separating the liquid from the solids. The dried solids are collected in the bottom of the chamber.

I claim:

1. The process of heat treating powdered material which comprises centrifugally spraying said material in a horizontal plane near the top of a chamber, burning a plurality of gaseous fuel jets uniformly arranged around said chamber, reflecting the heat of combustion into said plane and withdrawing gases and vapors from said chamber below the spray level.

2. The process of roasting coffee which comprises centrifugally spraying said coffee in powdered form into a horizontal plane near the top of a chamber, effecting combustion of a plurality of gas jets uniformly spaced around said chamber adjacent said plane, reflecting heat from said jets into said plane and withdrawing gases and vapors from said chamber below the spray level.

3. Apparatus for heat treating powdered material which comprises a cylindrical tower, a plurality of uniformly spaced gas jets arranged near the top of the tower, a centrifual sprayer supported in the ceiling of said tower, means for supplying powdered material to said sprayer, reflectors associated with said gas jets for reflecting the heat of combustion into the spray plane, and means for exhausting gas and vapors from the lower portion of said tower.

CHAMPLAIN L. RILEY.